Sept. 19, 1961 M. F. KRITCHEVER 3,000,415
THERMOPLASTIC BAG CLOSURE AND METHOD
Filed Aug. 1, 1960
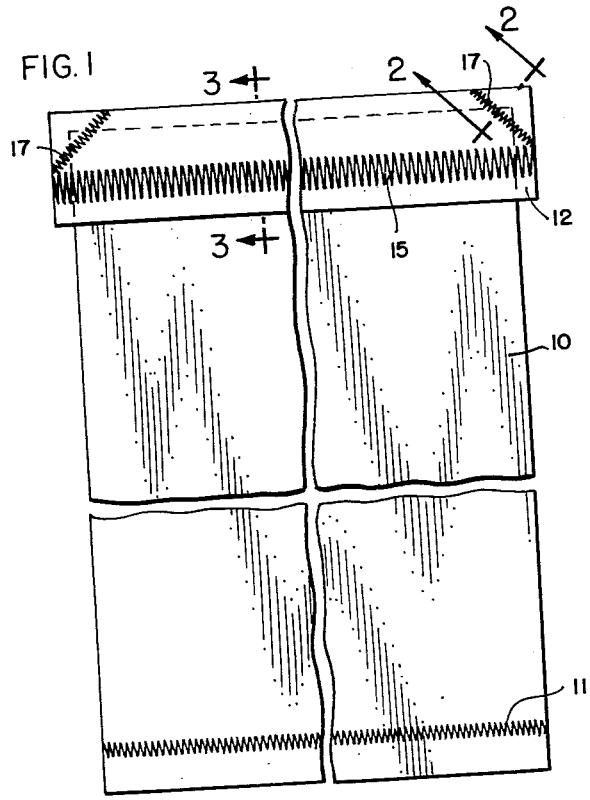
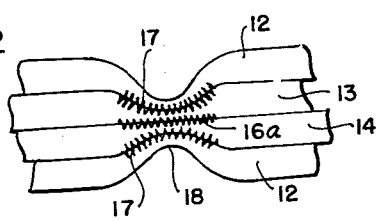
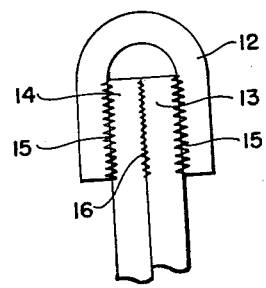
INVENTOR:
MATHEW F. KRITCHEVER
BY
Dawson, Tilton, Fallon & Lungmus
ATT'YS 3,000,415
THERMOPLASTIC BAG CLOSURE AND METHOD
Mathew F. Kritchever, Glencoe, Ill., assignor of twenty-five percent to Horace Dawson, Evanston, Ill.
Filed Aug. 1, 1960, Ser. No. 46,468
2 Claims. (Cl. 150—3)

This invention relates to a thermoplastic bag closure and method, and is particularly useful in connection with thick-walled plastic containers used for transporting heavy materials, such as cement, fertilizer, etc. In the filling of thermoplastic containers and subsequent heat sealing of the top of the containers, it is found that imperfect seals result in loss of shipping material, damage to other goods, etc. Films of material, such as, for example, dust from granular fertilizer, cement, and like materials, tend to coat the upper inner surfaces of the container lips, and such foreign material prevents effective heat sealing when the filled container is passed between the heat-sealing jaws. Various expedients have been employed, such as stitching the top of the container, but due to the yielding quality of the thermoplastic material, the stitching forms openings through which dust or fine material may escape. Even when pressure-sensitive tape is employed over the stitches, an unsatisfactory result is obtained because of the frequent dislodging of the tape, the expense of the tape, and the failure of the tape to prevent loss of material, particularly around the corners of the bags.

An object of the present invention is to provide a container and method by which materials may be packaged in thick-walled thermoplastic bags with effective sealing of the container under shipping conditions. A further object is to provide a container and method whereby effective sealing of a heavy walled container against the loss of material therein is accomplished at a minimum of cost and time. Other specific objects and advantages will appear as the specification proceeds.

The invention is shown in an illustrative embodiment by the accompanying drawing, in which—

FIG. 1 is a broken side view in elevation of a bag formed and sealed in accordance with my invention; FIG. 2, a sectional detail view on an enlarged scale, the section being taken as indicated at line 2—2 of FIG. 1; and FIG. 3, a detail sectional view on an enlarged scale, the section being taken as indicated at line 3—3 of FIG. 1.

In the illustration given, 10 designates a bag formed of thermoplastic material and heat sealed at 11 to form a bottom closure for the bag. 12 designates a U-shape sealing strip which is formed of thermoplastic material and which may be of the same material as the bag 10. The bag and seal may be formed of resin plastics or any suitable thermoplastic material as, for example, polyethylene, polypropylene, nylon, polyvinyl chloride, and mixtures and copolymers of each, including mixtures of polyethylene with isobutylene, etc.

After the bag 10 has been filled with the product material, such as cement, granular fertilizer, etc., a U-shape plastic strip 12 is placed over the top lips 13 and 14 at the open end of the bag and heat sealing transversely of the bag is accomplished along the line 15, as indicated best in FIG. 3. The sealing occurs between the inner surfaces or faces of the strip 12 and the outer surfaces of the lips 13 and 14, as shown best in FIG. 3. There may also be some sealing at 16. While such sealing may be imperfect by reason of the dust coating thereon, it is of value in forming a seal because the strain upon it is removed through the effective sealing of the U-shape strip 12 providing a support about the lips 13 and 14. It will be understood, however, that if desired the seal 16 may be omitted, the structure being subjected to merely enough heat and pressure to form the seal lines or welds 15. The U-shape strip may be extended on each side forming ears or handles.

For many purposes, it is found that the foregoing seal is sufficient to prevent the escape of any material from the bag 10. However, where extremely heavy materials are carried in the container 10 and an extremely sturdy seal is needed, diagonal seal lines or welds 17 are formed, as indicated in FIGS. 1 and 2. The seal lines or welds 17 are formed under high heat and pressure conditions so as to reduce the thickness of the composite layers as much as one-third of their original dimensions, forming a constriction 18 as indicated in FIG. 2. In this operation, an inner seal 16a between the lips 13 and 14 of the container is formed so as to provide a complete barrier against the escape of the contents of the bag. The seal 17 extends diagonally across each corner of the structure, including each corner of the bag 10 and the enclosing corner of the U-shape strip 12. It should not extend below the U-shape strip where it would weaken the bag structure.

While the tape seals or welds 17 weaken the structure and could not be employed along the transverse weld lines 15 for this reason, they do not interfere with the operation of the bag along the corners because there is no strain at these points of the bag structure. In fact, even if the corner portions outwardly of the weld lines 17 were torn away, the bag would remain intact and useful for shipping purposes.

Specific examples of the structure and apparatus may be set out as follows:

*Example I*

A bag formed of polyethylene admixed with polyisobutylene and having a wall thickness of 5 mils and a width of 18 inches was filled with granular fertilizer, and the lips of the bag collapsed as the bag was passed on a conveyor with the lips between rolls. A U-shape strip, as shown in the drawings, was placed in position over the bag, and the bag and strip passed between heat-sealing jaws of the traveling type (as manufactured by Doughboy Industries). Sufficient heat and pressure were then applied to the bag sealer, under electric current, to seal across the width of the bag and strip on both exterior faces. After the transverse seal was completed, the bag traveled into position between a pair of short sealing jaws to form a 45° or diagonal seal across the exposed corners. The latter seal was made at a very high temperature and pressure to compress the material and reduce the thickness to about one-third the original thickness. The sealed bag was found to be completely sealed against the escape of material so as to be dust-proof and waterproof.

*Example II*

The operation was carried on as described in Example I except that the material of the bag and sealing strip was approximately 10 mil, low density polyethylene. The bag was formed without the oblique sealing lines 17 and was found to be effective against the loss of fertilizer packed therein. Other bags were tested with the oblique welds, as indicated by 17 in the drawings, so as to prevent the escape of dust under agitation and rough-handling of the bag. Results comparable to those described in Example I were obtained.

While I have described in considerable detail the structure and procedure as illustrative of the invention, it will be understood that such details may be varied widely by those skilled in the art without departing from the spirit of my invention.

I claim:
1. A bag of thermoplastic material sealed at one end and having lips at the opposite open end, a U-shape thermoplastic strip enclosing said lips of the bag, a heat-sealing weld uniting the interior faces of the strip to the outer faces of the bag lips transversely of the bag, and a diagonal weld at each corner of the bag uniting the U-shape strip portions and the interior lips of the bag to each other.

2. The structure of claim 1 in which the diagonal weld extends between the interior lips of the bag.

References Cited in the file of this patent

UNITED STATES PATENTS 2,749,966 Roetger _____ June 12, 1956

FOREIGN PATENTS 979,077 France _____ Dec. 6, 1950
565,987 Belgium _____ Apr. 15, 1958